US006216227B1

United States Patent
Goldstein et al.

(10) Patent No.: US 6,216,227 B1
(45) Date of Patent: Apr. 10, 2001

(54) MULTI-VENUE TICKETING USING SMART CARDS

(75) Inventors: Theodore Charles Goldstein, Palo Alto; Jonathan B. Ziegler, Cupertino, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/106,600

(22) Filed: Jun. 29, 1998

(51) Int. Cl.$^7$ ...................................................... H04L 9/32
(52) U.S. Cl. ................................ 713/172; 705/65; 705/67
(58) Field of Search ..................... 705/65, 67; 713/172

(56) References Cited

U.S. PATENT DOCUMENTS

| | | | |
|---|---|---|---|
| 5,598,477 | 1/1997 | Berson | 380/51 |
| 5,721,781 | * 2/1998 | Deo et al. | 705/67 |
| 5,754,654 | * 5/1998 | Hiroya et al. | 705/76 |
| 6,005,942 | * 12/1999 | Chan et al. | 713/187 |

FOREIGN PATENT DOCUMENTS

| | | | |
|---|---|---|---|
| 628928 A1 | 12/1994 | (EP) | G07B/15/00 |
| 658862 A2 | 6/1995 | (EP) | G07F/7/10 |
| 658862 A3 | 6/1995 | (EP) | G07F/7/10 |
| 823694 A1 | 2/1998 | (EP) | G07F/7/08 |
| 829828 A1 | 3/1998 | (EP) | G07F/7/08 |

OTHER PUBLICATIONS

Rinaldo Di Giorgio, iButtons: The first ready–to–buy 2.0 Java Card API devices, Apr. 1998, 9 pages, Java World.
Wolfgang Rankl, et al., "Handbuch der Chipkarten," (in German), 1995, pp. 64–65, 202–205. English translation also provided.

* cited by examiner

*Primary Examiner*—Gilberto Barron, Jr.
(74) *Attorney, Agent, or Firm*—Park & Vaughan LLP

(57) ABSTRACT

A system and methods are provided for storing and validating electronic tickets for multiple venues on a single smart card. In accordance with this present embodiment, an operating system of the smart card includes a Java Virtual Machine and an applet loader key. A shared applet, including a venue loader key, is validated with the applet loader key and is stored on the smart card. One or more venue applets are also stored on the smart card, each with a venue key corresponding to an associated venue. Each venue applet is validated by the applet loader key and the venue loader key. The shared applet is used by the venue applets to interface with ticket loaders and ticket validation devices. Tickets are purchased for events associated with the venue applets and are stored on the smart card in association with the related venue applets. Ticket signatures are authenticated with each venue applet's venue key. A ticket is cancelled after being tendered to gain admittance to an event.

25 Claims, 5 Drawing Sheets

MULTI-VENUE TICKETING USING SMART CARDS

Sun, Sun Microsystems, the Sun logo, Java, and all Java-based trademarks and logos are trademarks or registered trademarks of Sun Microsystems, Incorporated in the United States and other countries.

BACKGROUND

This invention relates to the field of electronic commerce. More particularly, a system and methods are provided for electronic ticketing.

The use of tickets for sporting venues, entertainment events, travel and the like is no longer strictly a mechanical function. Ticketing systems have evolved to make use of computer systems in various phases of the ticket generation, issuance and validation processes.

For example, in U.S. Pat. No. 5,598,477, issued to Berson, a customer submits information concerning a desired ticket (e.g., scheduling data pertaining to an airline flight). A data processing system sends ticketing information and encrypted validation data to a local printing system. The local system prints the ticket, which includes the validating information encoded in a two-dimensional barcode. The customer presents the ticket at flight time, where a validating system scans the barcode, transforms the data from physical form into digital form and validates it. If valid, the customer receives his boarding pass, luggage claim checks, etc.

Berson, however, still requires the issuance of a paper ticket. Paper tickets are, of course, subject to theft, mutilation, destruction, loss, etc. In addition, a ticket produced according to the Berson system is necessarily good for only onetime use. The ticket is physically collected at the time of the flight. Two additional disadvantages exist with this scheme. First, the use of two-dimensional barcodes requires printers capable of producing, and barcode scanners capable of reading, such barcodes. Depending upon the number of sites at which tickets are printed or accepted, this may involve significant cost. Second, the use of cryptographic means to secure the validation information requires a sophisticated key management scheme.

In a modification of the Berson system, large random numbers may be used in place of cryptographic security. A particular random number is chosen and printed as a one-dimensional barcode on a physical ticket. The use of large numbers significantly decreases the chance of a person correctly guessing the number assigned to a particular ticket for a discrete event (e.g., airplane flight, entertainment event). The random numbers are stored in a database accessible to sites at which the tickets are used. When the ticket is presented at a site, the number on the ticket is compared to the list of valid numbers stored in the database. This scheme still possesses the disadvantages inherent in paper tickets, such as destruction or mutilation and the limitation to a single use. In addition, without further protection, the database of random numbers provides a single point of vulnerability. A person with access to the database could conceivably generate large quantities of bogus tickets, In addition to the above disadvantages, known ticketing systems provide admission to only a single event or a single site. Also, a paper ticket issued by a known system is not generally modifiable without physically replacing the issued ticket. In other words, a person who wishes to visit or enjoy multiple events or multiple venues must carry and present a different ticket for each event or venue. As he or she makes plans to visit even more events or venues, additional paper tickets must be purchased and carried, thus increasing the risk of loss.

SUMMARY

In one embodiment of the invention, a system and methods are provided for storing, on a single electronic device (e.g., smart card, hand-held computer), electronic tickets to events offered at multiple venues. In this embodiment, the electronic device receives and stores a venue module associated with each venue for which a ticket is purchased. The venue module enables the electronic device to store tickets for the associated venue, and includes a venue key for validating individual tickets. The electronic device also receives and stores a shared ticketing module containing instructions to be called by one or more venue modules. The shared ticketing module includes a "venue loader key" for validating installed venue modules.

After the electronic device is configured with the shared ticketing module and one or more venue modules, tickets for each installed venue module may be stored. In a present embodiment of the invention, the electronic device's user identifies parameters (e.g., event, date, time, seat) for a ticket and the corresponding electronic ticket is downloaded from a ticket loader, along with a ticket signature. The venue module for the corresponding venue module authenticates each stored ticket's signature using its venue key.

When a ticket is to be presented for admission to an event, in a present embodiment a validation device challenges the electronic device by issuing a challenge code. The venue module for the event's venue signs the code with its venue key and returns the signed code. After the signature is validated, the electronic device transmits the ticket for the event and the ticket is canceled.

DETAILED DESCRIPTION

The following description is presented to enable any person skilled in the art to make and use the invention, and is provided in the context of a particular application and its requirements. The present invention is not intended to be limited to the embodiments shown, but is to be accorded the widest scope consistent with the principles and features disclosed herein.

For example, in a present embodiment of the invention, cryptographic means are applied to ensure the security of electronic tickets and venue modules, or applets (e.g., small Java applications), that are loaded onto smart cards. One skilled in the art will recognize that the purpose of the cryptographic keys described below is to ensure the security and authenticity of information stored on a smart card, and does not necessarily rely upon a particular cryptographic scheme unless otherwise indicated. Various cryptographic keys are therefore described below for various purposes. The invention is not limited to a particular method of cryptographic security, however, and specific embodiments of the invention may use an asymmetric key scheme, a symmetric key scheme, or some other scheme as may be devised.

In accordance with one embodiment of the invention, a system and methods are provided for generating, storing and validating electronic tickets for multiple venues. The tickets are illustratively stored on a standard smart card, although other devices are also contemplated such as the PalmPilot by 3COM Corporation or the iButton by Dallas Semiconductor. The stored tickets may be for any occasions for which admission or passage may be pre-purchased, such as sporting events, entertainment events, airline flights, automobile tolls, etc. Each venue for which a ticket has been stored on a smart card in accordance with a present embodiment of the invention has an associated applet stored on the smart card. A shared ticketing applet is also stored. These applets are used, as described below, to interface between the smart card and ticket/venue loading facilities and between the smart card and ticket validation devices.

Figure 1:
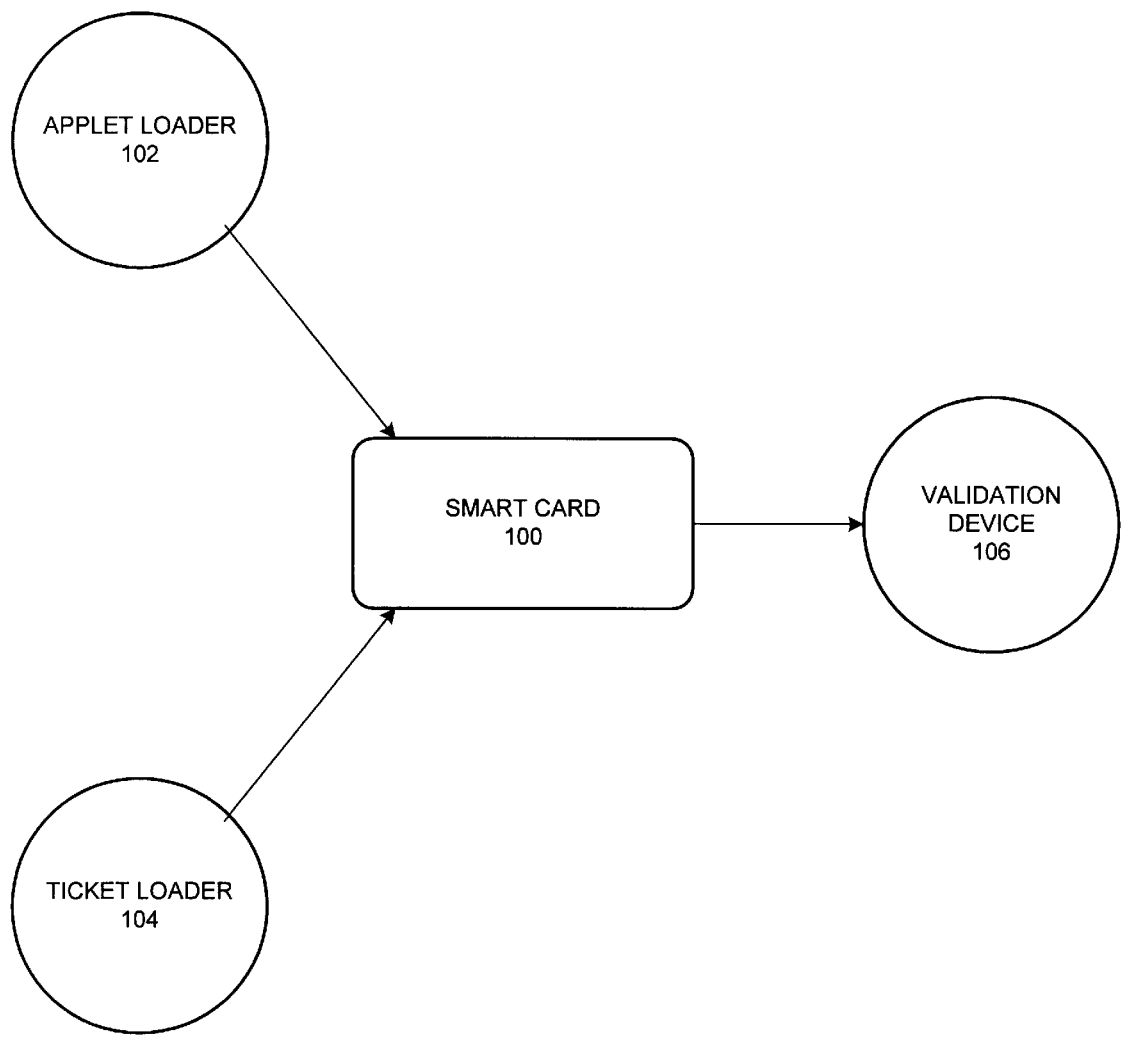
FIG. 1 is a block diagram depicting one system in which a smart card is used to store venue applets and tickets for admission to a venue in accordance with an embodiment of the present invention.

FIG. 1 depicts an illustrative system for issuing, storing and validating tickets stored on a user's smart card in an embodiment of the invention. Smart card 100 may comply with the ISO 7816 specification for smart cards. As such, it is capable of storing various types and amounts of electronic data for later retrieval.

Applet loader 102 loads one or more applets onto smart card 100. The applets that are loaded onto smart card 100 by applet loader 102 enable smart card 100 to store tickets to venues associated with the loaded applets. For example, one venue applet may correspond to baseball games hosted by the San Francisco Giants. Loading this applet enables smart card 100 to store tickets for specific games or a range of games (e.g., a season pass). Illustratively, applet loader 102 is configured to load an applet pertaining to a single venue. In an alternative embodiment, however, applet loader 102 loads applets from multiple venues.

In addition to venue applets (i.e., applets associated with individual venues), a shared ticketing applet is also loaded onto smart card 100 for use by all venue applets. As discussed below, this shared applet provides functions commonly available to, and used on behalf of, each of the venue applets.

Ticket loader 104 loads electronic tickets for individual events (or a range of events) onto smart card 100. Each smart card is capable of storing multiple tickets, for the same or different events, venues, dates, etc. Illustratively, each ticket loaded onto smart card 100 is stored in association with the venue applet corresponding to the venue that is hosting the event and will accept the ticket. In a present embodiment, a venue's applet is loaded onto smart card 100 (e.g., by applet loader 102) before a ticket for an event at that venue is loaded.

Illustratively, ticket validation device 106 is located at a venue hosting an event for which a ticket is stored on smart card 100. Validation device 106 validates the ticket to ensure that it is for a current event and accepts the ticket based upon this validation.

In a present embodiment of the invention, applet loader 102, ticket loader 104 and validation device 106 are separate electronic systems equipped to accept, read from, and write to smart card 100. In this embodiment, a user physically presents smart card 100 to each system in order to effect the desired transaction. In an alternative embodiment, any or all of applet loader 102, ticket loader 104 and validation device 106 are co-located, particularly the applet loader and ticket loader.

In yet a further alternative embodiment of the invention, any or all of applet loader 102, ticket loader 104 and validation device 106 comprise a computer system connected to the Internet or other wide area network. In such an embodiment, these systems are accessed by the user through a user computer system that is equipped to accept, read from, and write to smart card 100.

Figure 2:
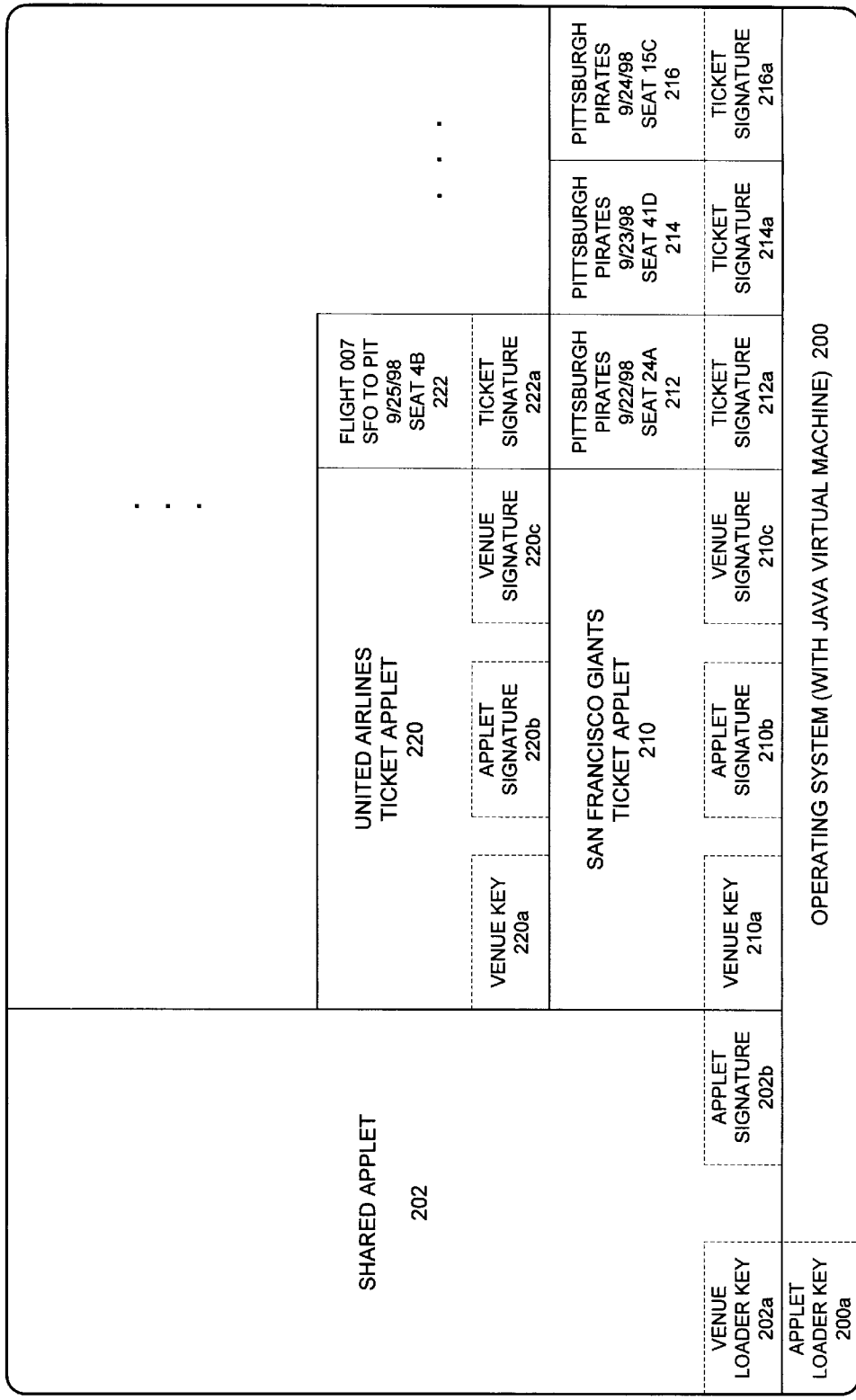
FIG. 2 depicts a smart card populated with multiple venue applets and tickets in accordance with an embodiment of the present invention.

FIG. 2 depicts smart card 100 populated with the shared ticketing applet, multiple venue applets, and multiple tickets. Smart card 100 incorporates operating system 200 to interface with other devices (such as applet loader 102, ticket loader 104 and validation device 106 from FIG. 1) and manage the storage and retrieval of information from the smart card. Operating system 200 includes, in the illustrated embodiment, a Java Virtual Machine (JVM) for operating loaded applets. Operating system 200 further includes cryptographic key 200a (hereinafter termed the "applet loader key") for validating applets loaded onto smart card 100. Thus, applet signatures 202b, 210b and 220b are authenticated with applet loader key 200a when the applets are loaded. Illustratively, applet signatures are created prior to, or concurrent with, the loading of the associated applet.

Shared ticketing applet 202 comprises instructions (e.g., in the form of modules, objects, functions, etc.) called upon by the various venue applets installed on smart card 100. Shared ticketing applet 202 provides functions common to each venue applet (e.g., ticket validation, protocols for communicating with ticket loader 104 and validation device 106) and therefore allows each venue applet to be smaller in size, thus conserving storage space on smart card 100. For example, in one embodiment of the invention shared ticketing applet 202 provides instructions for loading a ticket, validating a ticket, and/or canceling a ticket (e.g., after it has been used to gain admittance to an event). Shared ticketing applet 202 includes cryptographic key 202a (hereinafter termed the "venue loader key") to validate individual venue applets, as described below. In particular, when a venue applet is loaded, shared ticketing applet 202 authenticates each applet's venue signature.

In an alternative embodiment of the invention, shared ticketing applet 202 comprises instructions for enforcing or ensuring adherence to ticket details. For example, in such an embodiment smart card 100 could be inserted into a smart card reader located within a seating area at an event to verify that a user is in his or her ticketed seat or to help him or her find the correct seat.

Venue applets 210, 220 are shown installed on smart card 100. Venue applet 210 illustratively represents home baseball games of the San Francisco Giants. Venue applet 220 illustratively represents United Airlines flights. Venue applets 210, 220 include cryptographic keys 210a, 220a (hereinafter termed "venue keys") that are used to authenticate venue applets 210, 220 to ticket loader 104 prior to loading a ticket. Venue keys are also used to validate ticket signatures that accompany tickets for the associated venue.

Venue applets 210, 220 also include applet signatures 210b, 220b for validating the venue applets to operating system 200. As discussed above, applet signatures are illustratively created by applet loader 102 prior to, or concurrent with, the loading of venue applets. Operating system 200 then authenticates applet signatures 210b, 220b with applet loader key 200a when the applets are loaded.

Venue applets 210, 220 further include venue signatures 210c, 220c for validating the venue applets to the shared ticketing applet. Similar to applet signatures 210b, 220b, venue signatures 210c, 220 are created prior to or concurrent with the installation of venue applets 210, 220. When the venue applets are loaded, shared ticketing applet 202 authenticates the venue signatures.

Tickets 212, 214, 216 represent particular home ballgames played at the San Francisco Giants venue. Ticket 222 represents a particular flight offered by United Airlines, from San Francisco to Pittsburgh, Pa.

Each ticket stored on smart card 100 includes information concerning the related event. Thus, tickets 212, 214 and 216 include information such as the date of the game, opponent and an assigned seat number. The information stored in a ticket is used with the ticket signature, in a present embodiment of the invention, to validate the authenticity of the ticket. Thus, the amount and type of information stored with a ticket varies depending upon the venue, event, type of ticket, etc. Instead of individual tickets 212, 214 and 216, the owner of smart card 100 may, for example, have just one ticket in the form of a season pass. The season pass ticket is good for more than one date and will therefore include information different from tickets 212, 214, 216.

Each of tickets 212, 214, 216 and 222 includes a ticket signature (represented by the numerals 212a, 214a, 216a and 222a) generated by ticket loader 104 with a key of the corresponding venue. In an embodiment of the invention using public key encryption (PKE) and asymmetric key pairs, and where venue keys 210a, 220a are public venue keys, the ticket signatures are generated using the private keys corresponding to the public keys. In an alternative embodiment using symmetric keys (e.g., DES), ticket loader 104 signs issued tickets with a copy of venue keys 210a, 220a. As mentioned above, when a ticket is loaded onto smart card 100, the corresponding venue applet validates the ticket by authenticating the ticket signature with its venue key.

One skilled in the art will recognize that an applet stored on smart card 100 is able to keep data private and thus inaccessible to other stored applets. This prevents one applet from corrupting or examining tickets associated with a particular venue applet. In a present embodiment, however, tickets are cancelled or deactivated after being presented to validation device 106. In an alternative embodiment, individual tickets are deleted or overwritten.

Loading an Applet

In a present embodiment of the invention, the venue applets and the shared ticketing applet that are loaded onto smart card 100 comprise executable computer programs or modules of executable computer code. In a present embodiment of the invention, the shared ticketing applet is substantially identical from one smart card to another. Further, each venue's venue applets are similar from one smart card to another, except for the venue key and any tickets that may be loaded.

In one embodiment of the invention, venue applets comprise Java applications constructed according to a standard method. For example, a file containing the Java programming instructions is compiled with a Java compiler to form a binary class file. The class file is then converted into a smart card application file. During this conversion process, the card application file is digitally signed using applet loader key 200a (shown in FIG. 2) or its complement, depending upon the type of cryptographic encryption (e.g., symmetric or asymmetric).

Figure 3:
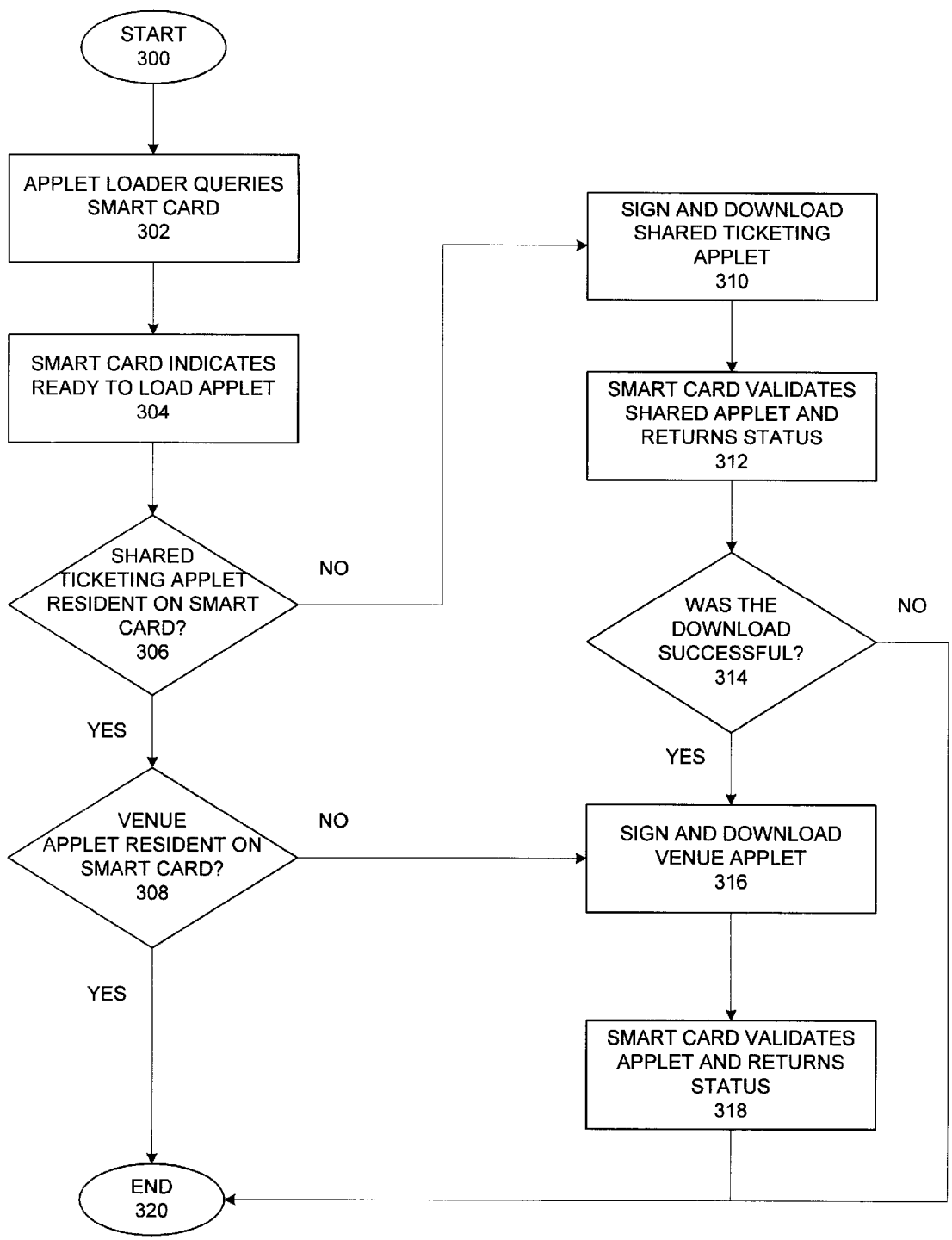
FIG. 3 is a flow chart demonstrating one method of loading a venue applet onto a smart card in accordance with an embodiment of the present invention.

FIG. 3 depicts an illustrative process by which a signed card application file (e.g., applet 210 in FIG. 2) is loaded onto smart card 100 from applet loader 102. Applet loader 102 is, in a present embodiment of the invention, a ticket vending machine and is co-located with ticket loader 104. In this embodiment, venue applet 210 is automatically loaded when a Giants' baseball ticket is purchased, unless the applet is already resident on smart card 100. Also, in this embodiment shared ticketing applet 202 is automatically loaded if not resident on smart card 100. In an alternative embodiment, either or both of shared ticketing applet 202 and venue applet 210 are pre-loaded on smart card 100 at the time it is manufactured or the time it is sold.

With reference now to FIG. 3, state 300 is a start state. In state 302, applet loader 102 is coupled to smart card 100 and prepares to download applet 210. Illustratively, the owner of smart card 100 inserts the smart card into a device comprising applet loader 102 and selects applet 210 for installation (e.g., by indicating a desire to purchase Giants baseball tickets). In an alternative embodiment, the owner inserts smart card 100 into a separate computer system connected to applet loader 102 via the Internet or other communication link.

In state 304, smart card 100 indicates that it is prepared to load an applet and, in a present embodiment, passes the applet loader information concerning its present configuration (e.g., which applets are loaded, which versions of operating system and Java Virtual Machine are installed). In one embodiment, smart card 100 performs a self-check prior to indicating that it is ready to receive an applet. Illustratively, the self-check tests the card's ability to store and retrieve data and tests for bad or damaged memory cells. Information transmitted to applet loader 102 by the smart card may include the amount of storage space available on the card. If insufficient space exists for loading the selected applet, an error message is displayed for the user.

In state 306, applet loader 102 determines whether shared ticketing applet 202 is already resident on smart card 100. As described above, shared ticketing applet 202 contains instructions used by venue applet 210 and other venue applets. Illustratively, this determination is made based upon information returned to applet loader 102 by smart card 100 in state 304.

If it is determined in state 306 that shared ticketing applet 202 is not installed on smart card 100, the process continues with state 310. Otherwise, in state 308 it is determined whether venue applet 210 is already loaded on smart card 100. If not, the process proceeds to state 316. If, however, both applets are already loaded, the process exits in end state 320.

In state 310 the shared ticketing applet is signed (e.g., by applet loader 102), if not already signed, with a cryptographic key complementary to applet loader key 200a (e.g., when using an asymmetric encryption scheme, a "private" key corresponding to "public" key 200a) to create applet signature 202b (shown in FIG. 2). The signed applet is then downloaded to smart card 100. Illustratively, applets are downloaded and stored on the smart card in multiple streams of bytes (e.g., approximately 200 bytes in each stream), and each stream is validated by an associated checksum. In state 312, the smart card validates accurate receipt of the applet and, in state 314, informs the applet loader whether the installation was successful or not. If shared applet 202 could not be correctly loaded, an error message is returned and the process ends at end state 320.

If the installation of shared ticketing applet 202 was successful or, if it was determined in state 308 that venue applet 210 has not been loaded, the process continues at state 316.

In state 316, venue applet 210 is signed (if not already signed) by applet loader 102 to create applet signature 210b and/or venue signature 210c and is then downloaded onto smart card 100 from applet loader 102. Venue key 210a, as discussed below, will be used to authenticate venue applet 210 to ticket loader 104 and to validate tickets loaded from the ticket loader. Depending upon the type of cryptographic security that is preferred (e.g., symmetric or asymmetric keys), applet signature 210b and venue signature 210c are created with applet loader key 200a and venue loader 202a, respectively, or with their complements.

In state 318, smart card 100 validates the downloaded applet and indicates to the applet loader that it was successfully loaded or that an error was encountered. Illustratively, smart card 100 validates successful receipt of the applet by computing a checksum and comparing it to a checksum provided by applet loader 102. In an alternative embodiment, applet signature 210b of the downloaded applet is validated using a cryptographic technique corresponding to the form of the key used to create the signature. In one particular such embodiment, smart card 100 computes a hash value from the applet and compares it to a hash value retrieved from the signature. If they match, the smart card considers the applet to have been received intact. A similar process is used to validate a ticket signature when a ticket is downloaded. The process then ends at end state 320.

Loading a Ticket

Once a venue applet is loaded onto smart card 100, tickets for events at that venue (e.g., matches or games at a sporting field, flights offered by an airline) may be purchased and loaded as well. Venue applets, shared ticketing applet 202 and related tickets are, in a present embodiment of the invention, loaded in conjunction with each other, as necessary, from a combined ticket/applet loader.

Figure 4:
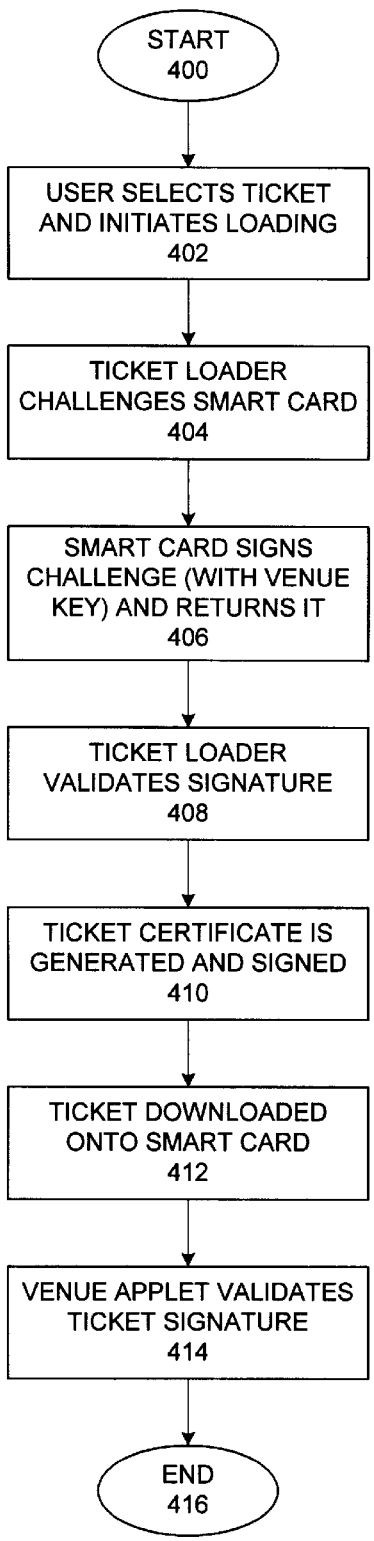
FIG. 4 is a flow chart demonstrating one method of loading a ticket onto a smart card in accordance with an embodiment of the present invention.

FIG. 4 depicts an illustrative procedure for purchasing an electronic ticket to a Giants baseball game (for which venue applet 210 has been installed) from ticket loader 104 and installing it on smart card 100. In a present embodiment of the invention, ticket loader 104 is part of a web server connected to a public network such as the Internet. In this embodiment, smart card 100 is coupled to a computer system operated by the owner of smart card 100 that is also connected to the Internet. Tickets are selected using an interface for the venue's web server, and then downloaded over the Internet and stored on smart card 100.

With reference now to FIG. 4, state 400 is a start state. In state 402, the owner of smart card 100 initiates the ticket purchasing/loading procedure. In one embodiment of the invention, the owner first selects an event for which a ticket is desired. In the presently described embodiment, for example, a baseball game is identified along with the number and type of seats desired. As another example, the owner identifies to an airline reservation agent a flight the owner wishes to take, including a date and time and perhaps a seat. After the smart card owner selects his or her venue/event and specifies any necessary or criteria concerning the event, he or she signals acceptance of the ticket as configured.

In state 404, ticket loader 104 identifies itself to and challenges smart card 100 in order to authenticate the card and/or venue applet 210. Illustratively, the challenge is a "zero knowledge proof" taking the form of a random number transmitted to smart card 100 by ticket loader 104. In state 406, venue applet 210 meets the challenge by generating a digital signature with venue key 210a, and returning the result to ticket loader 104. In an alternative embodiment, venue applet 210 meets the challenge in step 406 by encrypting the random number with venue key 210a and returning the result to ticket loader 104.

In state 408, ticket loader 104 validates the signature received from smart card 100. For purposes of this validation, ticket loader 104 possesses a key complementary to venue key 210a. For example, in an embodiment of the invention employing asymmetric keys (e.g., RSA), wherein venue key 210a is a public key of the associated venue, ticket loader 104 possesses the corresponding private key. In an embodiment of the invention using symmetric keys (e.g., Digital Encryption Standard), ticket loader 104 and venue applet 210 possess copies of the same key. If the validation attempt fails, the ticket loading process either attempts the challenge/validation procedure again (up to a limited number of times) or fails and reports an error, depending upon the implementation and security concerns.

Next, in state 410 ticket loader 104 generates and signs ticket 212 for the venue based upon the event data selected by the smart card owner/user. Illustratively, ticket loader 104 signs ticket 212 using the same key with which venue applet 210 was validated in state 408. In state 412, ticket 212, complete with signature 212a, is downloaded and stored on smart card 100.

In state 414, venue applet 210 validates downloaded ticket 212 by authenticating signature 212a with venue key 210a and respond with a message indicating success or failure. In an alternative embodiment of the invention, a second venue key, different from venue key 210a is stored with venue applet 210 for the purpose of validating downloaded tickets. The procedure ends with end state 416.

In the presently described embodiment, the process described above must be followed for each ticket downloaded from ticket loader 104. In an alternative embodiment, multiple tickets may be selected, processed and downloaded for a single venue at a time.

Validating a Ticket

Figure 5:
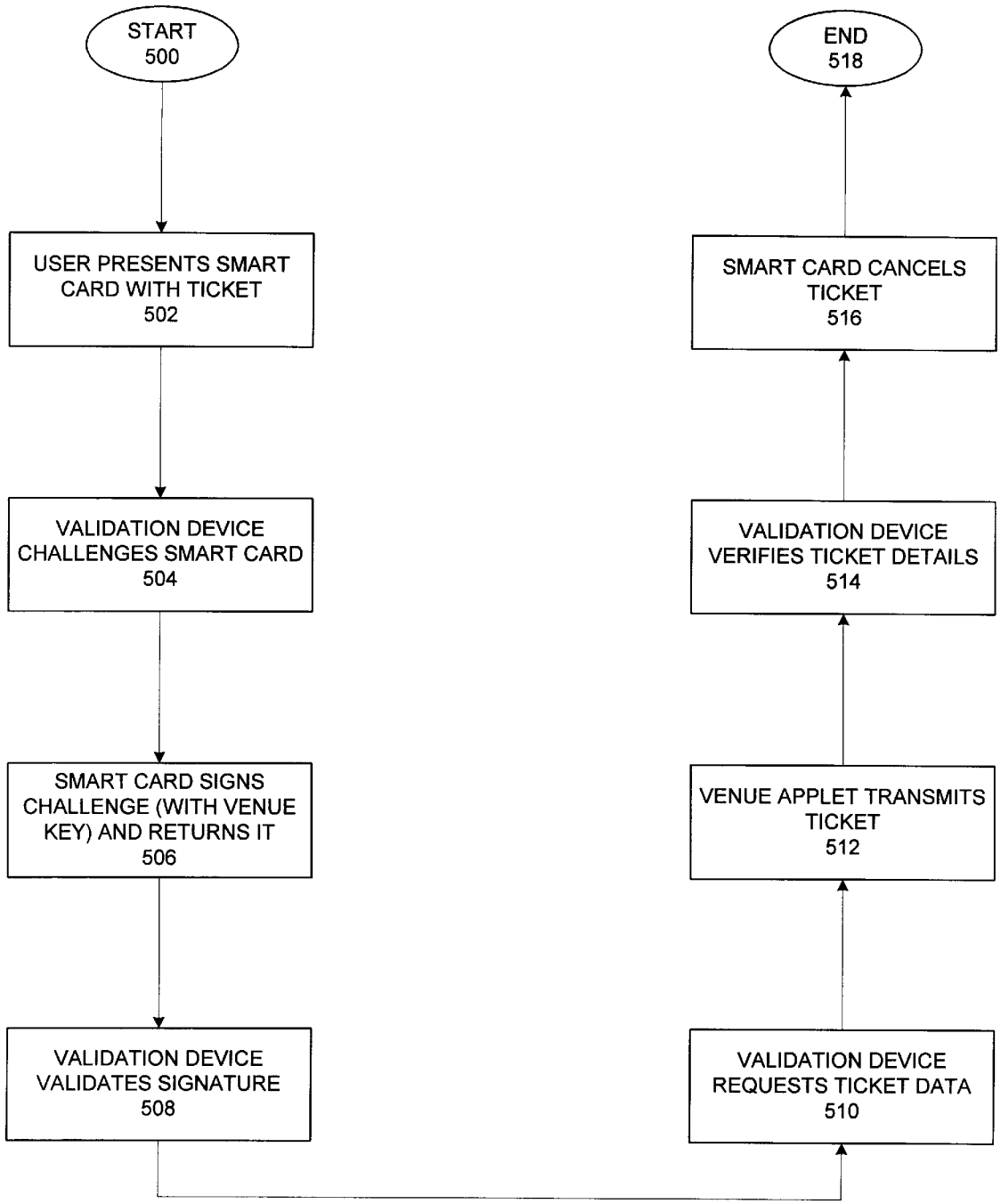
FIG. 5 is a flow chart demonstrating one method of validating a ticket stored on a smart card in accordance with an embodiment of the present invention.

In a present embodiment of the invention, tickets are validated by validation device 106 when presented for acceptance at the appropriate venue. FIG. 5 depicts an illustrative procedure for validating ticket 212 in accordance with a present embodiment of the invention.

State 500 is a start state. In state 502, a user presents smart card 100 to validation device 106 in order to gain admittance to the ball game identified in ticket 212. Illustratively, validation device 106 comprises a computer system configured to accept and communicate with smart card 100.

In state 504, validation device 106 generates and issues a challenge to smart card 100 as was done in the ticket loading procedure described above. The random number provided to smart card 100 is signed by venue applet 210, using venue key 210a, in state 506. In state 508, the validation device authenticates the signature using a key complementary to venue key 210a. By authenticating the signature returned with the challenge, validation device 106 is able to validate venue applet 210.

After authenticating the signature, in state 510 validation device 106 requests ticket data retained by smart card 100. Venue applet 210 transmits ticket 212 (e.g., the ticket data and signature) to validation device 106 in state 512. Illustratively, validation device 106 is only informed of stored ticket(s) usable for a current event, which are identified by the date, time and/or other identifying data. In one embodiment of the invention, shared ticketing applet 202 determines the ticket(s) to be identified to validation device 106 (e.g., by determining which venue—and therefore which venue applet and tickets—corresponds to the validation device). Alternatively, venue applet 210 and validation device 106 communicate in order to determine which, of multiple tickets associated with the present venue, should be used.

In state 514, validation device 106 verifies the ticket data (e.g., confirms the date, time, participating teams, seat number) and authenticates the ticket signature. If the ticket data and signature pass inspection, smart card 100 is instructed to cancel or erase ticket 212 and the user is admitted.

In the presently described embodiment of the invention, ticket 212 will be overwritten with a future ticket loaded onto smart card 100. In an alternative embodiment, tickets are not erased or overwritten.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of using an electronic device to store tickets, comprising:

receiving a first venue module associated with a first venue, said first venue module including a first venue key for validating a ticket for said first venue;

validating said first venue module with a module loader key of the electronic device;

receiving a shared module said shared module comprising an instruction used by said first venue module;

validating said shared module with said module loader key;

receiving a first ticket for said first venue;

receiving a first ticket signature associated with said first ticket; and authenticating said first ticket signature with said first venue key.

2. The method of claim 1, further comprising:

receiving a second venue module associated with a second venue, said second venue module including a second venue key for validating a ticket for said second venue;

validating said second venue module with said module loader key;

receiving a second ticket for an event offered at said second venue;

receiving a second ticket signature with said second ticket; and authenticating said second ticket signature with said second venue key;

wherein said first venue is different from said second venue.

3. The method of claim 1, wherein each of said first venue module and said shared module include a module signature and wherein said validating comprises authenticating the module signature of the validated module with the module loader key.

4. The method of claim 1, wherein said shared module includes a shared venue key for validating a venue module, further comprising validating said first venue module with said shared venue key.

5. The method of claim 1, wherein said receiving a first ticket comprises:

receiving a challenge from a ticket loader;

signing said challenge with said first venue key; and transmitting said signed challenge to said ticket loader.

6. The method of claim 1, wherein said receiving a first venue module comprises:

receiving a first series of instructions for processing a ticket for an event at a first venue;

receiving a first venue key for said first venue;

storing said series of instructions; and storing said first venue key in association with said series of instructions.

7. The method of claim 6, further comprising:

determining whether said shared module is stored on the electronic device; and replacing said shared module if said shared module is stored on the electronic device.

8. The method of claim 6, wherein said receiving a shared module comprises:

receiving a second series of instructions used by one or more venue modules;

receiving a venue loader key for validating said one or more venue modules;

storing said second series of instructions; and storing said venue loader key in association with said second series of instructions.

9. The method of claim 1, wherein said validating said first venue module comprises authenticating a module signature of said first venue module with a module loader key of the electronic device.

10. The method of claim 1, further comprising canceling said first ticket.

11. The method of claim 10, wherein said canceling said first ticket comprises marking said first ticket invalid.

12. The method of claim 7, wherein said replacing said shared module comprises:

marking said shared module invalid; and receiving a new version of said shared module.

13. The method of claim 1, further comprising providing said first ticket to a validation device of said first venue.

14. A method of maintaining tickets for multiple venues on an electronic device, comprising:

storing a first venue module, wherein said first venue module is associated with a first venue and includes a first venue key;

storing a shared module, said shared module comprising an instruction used by said first venue module and having a shared venue key for validating said first venue module;

validating said shared module;

receiving a challenge from a ticket loader;

signing said challenge with a first digital signature using said first venue key;

transmitting said signed challenge to said ticket loader;

receiving a first electronic ticket for said first venue;

receiving a first ticket signature, said first ticket signature being associated with said first electronic ticket; and authenticating said first ticket signature with said first venue key.

15. The method of claim 14, further comprising:

storing a second venue module, wherein said second venue module is associated with a second venue and includes a second venue key;

wherein said second venue is different from said first venue.

16. The method of claim 15, further comprising:

receiving a second electronic ticket for said second venue;

receiving a second ticket signature, said second ticket signature being associated with said second electronic ticket; and authenticating said second ticket signature with said second venue key.

17. The method of claim 14, wherein said receiving a challenge comprises receiving a randomly generated number.

18. The method of claim 14, wherein said receiving a first electronic ticket comprises receiving one or more details of an event at said first venue.

19. The method of claim 14, further comprising:

receiving a second challenge from a validation device at said first venue;

signing said second challenge using said first venue key;

transmitting said signed second challenge to said validation device; and transmitting said first electronic ticket.

20. The method of claim 19, further comprising canceling said first electronic ticket.

21. The method of claim 19, wherein said receiving a second challenge comprises receiving a randomly generated number.

22. The method of claim 19, wherein said transmitting said first ticket comprises transmitting one or more details comprising said first electronic ticket.

23. The method of claim 14, wherein said validating comprises validating said first venue module with one or more of said shared venue key and a module loader key stored on the electronic device.

24. An electronic device for storing tickets, said device comprising a memory configured to store:

a shared module, said shared module comprising an instruction used by one or more venue modules and having a shared venue key configured for validating said one or more venue modules;

a first venue module associated with a first venue, said first venue module including a first venue key for validating tickets for said first venue;

a module loader key for validating one or more of said shared module and said first venue module; and a first ticket for said first venue, said first ticket having a first ticket signature, wherein said first ticket signature is authenticatable with said first venue key.

25. A computer readable storage medium storing instructions that, when executed by a computer, cause the computer to perform a method of using an electronic device to store a ticket, the method comprising:

receiving a first venue module associated with a first venue, said first venue module including a first venue key for validating a ticket for said first venue;

validating said first venue module with a module loader key of the electronic device;

receiving a shared module, said shared module comprising an instruction used by said first venue module;

validating said shared module with said module loader key;

receiving a first ticket for said first venue;

receiving a first ticket signature associated with said first ticket; and authenticating said first ticket signature with said first venue key.

* * * * *